(12) United States Patent
Kuranuki et al.

(10) Patent No.: US 9,871,460 B2
(45) Date of Patent: Jan. 16, 2018

(54) POWER SOURCE SWITCHING DEVICE AND STORAGE BATTERY SYSTEM

(71) Applicant: Panasonic Intellectual Property Management Co., Ltd., Osaka (JP)

(72) Inventors: Masaaki Kuranuki, Kyoto (JP); Masahiko Kubo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 14/891,347

(22) PCT Filed: Jun. 23, 2014

(86) PCT No.: PCT/JP2014/003344
§ 371 (c)(1),
(2) Date: Nov. 14, 2015

(87) PCT Pub. No.: WO2015/045226
PCT Pub. Date: Apr. 2, 2015

(65) Prior Publication Data
US 2016/0087426 A1    Mar. 24, 2016

(30) Foreign Application Priority Data

Sep. 30, 2013 (JP) ................................. 2013-203354
Feb. 28, 2014 (JP) ................................. 2014-037865

(51) Int. Cl.
*H02M 5/42* (2006.01)
*H02H 7/12* (2006.01)
(Continued)

(52) U.S. Cl.
CPC ............. *H02M 5/42* (2013.01); *H01H 9/548* (2013.01); *H01H 47/002* (2013.01);
(Continued)

(58) Field of Classification Search
CPC ............. H01H 9/548; H01H 2047/003; H01H 47/002; H02H 7/1216; H02J 3/005;
(Continued)

(56) References Cited

U.S. PATENT DOCUMENTS 4,763,013 A * 8/1988 Gvoth, Jr. ............... H02J 9/062
                                                        307/46
5,859,499 A * 1/1999 McAfee .................... H02J 9/06
                                                        307/128
(Continued)

FOREIGN PATENT DOCUMENTS

JP    59-129542    7/1984
JP    5-182771     7/1993
(Continued)

OTHER PUBLICATIONS

International Search Report of PCT application No. PCT/JP2014/003344 dated Jul. 15, 2014.

*Primary Examiner* — Fred E Finch, III
*Assistant Examiner* — Demetries A Gibson
(74) *Attorney, Agent, or Firm* — McDermott Will & Emery LLP (57) ABSTRACT

A third relay switches between an output of a first AC power source fed via a first relay and an output of a second AC power source fed via a second relay, and supplies the output after the switching to a load. A welding detection unit detects welding of the first relay. In order to switch the output of the first AC power source to the output of the second AC power source and supply the output of the second AC power source to the load, a power source switching control unit switches the first relay from the closed state to the open state, switches the third relay so as to select and feed the output of the second AC power source, and then prohibits switching of the second relay from the open state to the closed state until a (Continued)

first-relay welding detection processing by the welding detection unit is completed.

6 Claims, 4 Drawing Sheets

(51) Int. Cl.
```
H02J 9/06      (2006.01)
H01H 9/54      (2006.01)
H01H 47/00     (2006.01)
H02J 3/00      (2006.01)
H02M 1/10      (2006.01)
H02J 7/02      (2016.01)
```
(52) U.S. Cl.
CPC ............ *H02H 7/1216* (2013.01); *H02J 3/005* (2013.01); *H02J 9/06* (2013.01); *H02J 9/061* (2013.01); *H01H 2047/003* (2013.01); *H02J 7/02* (2013.01); *H02M 1/10* (2013.01)

(58) Field of Classification Search
CPC .... H02J 9/06; H02J 7/02; H02J 9/061; H02M 5/42; H02M 1/10
See application file for complete search history.

(56) References Cited

U.S. PATENT DOCUMENTS

| | | | | |
|---|---|---|---|---|
| 7,368,829 B2 * | 5/2008 | Tezuka | ................. | H01H 47/002 307/9.1 |
| 7,459,910 B2 * | 12/2008 | Kawamura | .......... | H01H 47/002 307/39 |
| 8,035,942 B2 * | 10/2011 | Meinherz | ............. | H01H 47/004 307/140 |
| 8,085,515 B2 * | 12/2011 | Yugou | ................. | H01H 47/002 361/23 |
| 9,401,255 B2 * | 7/2016 | Kurita | ................. | H01H 47/002 |
| 2002/0130556 A1* | 9/2002 | Hohri | ...................... | H02J 9/061 307/65 |
| 2007/0018506 A1* | 1/2007 | Paik | .......................... | H02J 9/06 307/115 |
| 2011/0163759 A1* | 7/2011 | Ishii | ...................... | H02H 3/162 324/551 |

FOREIGN PATENT DOCUMENTS

| | | |
|---|---|---|
| JP | 10-144476 | 5/1998 |
| JP | 2000-173428 | 6/2000 |
| JP | 2006-155915 | 6/2006 |

* cited by examiner

POWER SOURCE SWITCHING DEVICE AND STORAGE BATTERY SYSTEM

This application is a U.S. national stage application of the PCT international application No. PCT/JP2014/003344.

TECHNICAL FIELD

The present invention relates to a power source switching device and a storage battery system.

BACKGROUND ART

A storage battery system including a power source switching device is known. The power source switching device selects one of output power from a commercial alternating current (AC) power source and output power from an auxiliary AC power source including a storage battery and an inverter, and supplies the selected one to a load. In a certain conventional method, in order to suppress the occurrence of arc discharge, the following processing is performed: in the case where power is supplied to a load via a relay disposed on a feeder wire, in order to stop the power supply to the load, the relay is disconnected after the current flowing on the feeder wire becomes zero (Patent Literature 1).

CITATION LIST

Patent Literature

PTL 1: Unexamined Japanese Patent Publication No. 2006-155915

SUMMARY OF THE INVENTION

In the conventional method, switching between AC power sources can be performed while a failure of an apparatus due to arc discharge is suppressed, but the relay cannot be disconnected before the current flowing on the feeder wire becomes zero. Therefore, switching between the AC power sources cannot be performed before the current flowing on the feeder wire becomes zero, and hence the switching duration between the AC power sources cannot be reduced. In this method, detection of zero current is required, and the switching processing between the AC power sources is complicated.

The purpose of the present disclosure is to provide a power source switching device and a storage battery system capable of reducing the switching duration between AC power sources while suppressing a failure of an apparatus due to arc discharge.

The power source switching device of the present disclosure includes the following components:

a third relay for switching between an output of a first AC power source fed via a first relay and an output of a second AC power source fed via a second relay, and supplying the output after the switching to a load;

a welding detection unit for detecting welding of the first relay; and a power source control unit that, in order to switch the output of the first AC power source to the output of the second AC power source and supply the output of the second AC power source to the load, switches the first relay from the closed state to the open state, switches the third relay so as to select and feed the output of the second AC power source, and then prohibits the switching of the second relay from the open state to the closed state until a first-relay welding detection processing by the welding detection unit is completed.

The present disclosure can provide a power source switching device and a storage battery system capable of reducing the switching duration between AC power sources while suppressing a failure of an apparatus due to arc discharge.

DESCRIPTION OF EMBODIMENTS

Hereinafter, an example of an exemplary embodiment of the present invention is specifically described with reference to the accompanying drawings. In each referred drawing, the same elements are denoted with the same reference marks, and the repeated descriptions of the same elements are omitted in principle.

Figure 1:
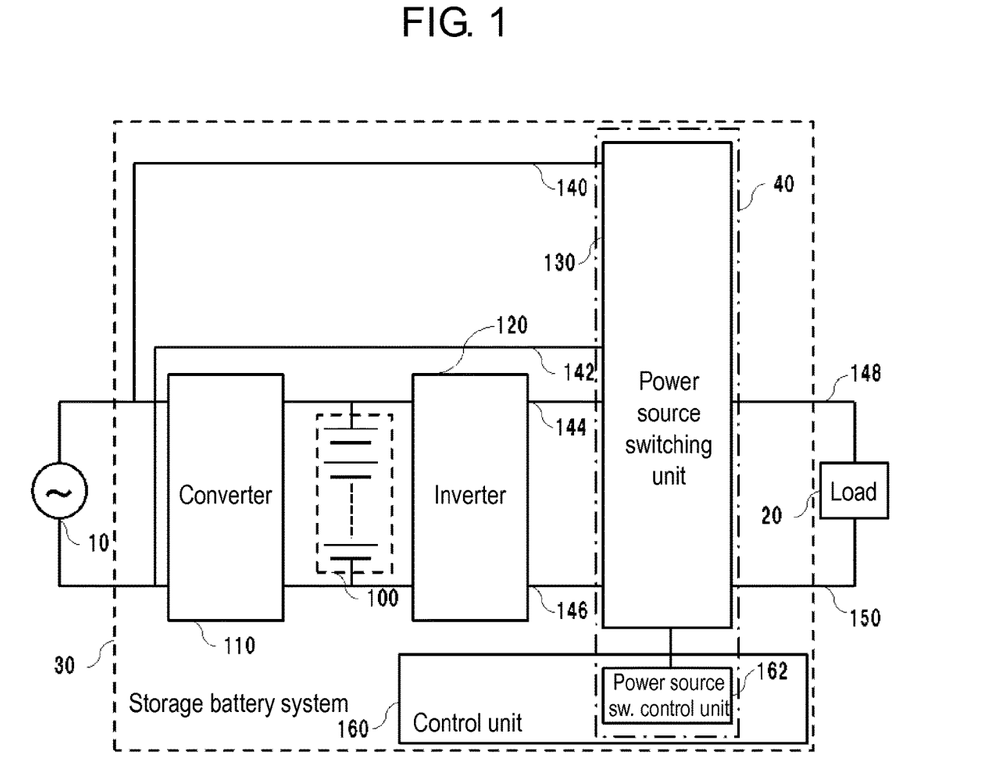
FIG. 1 is a diagram for illustrating a storage battery system in accordance with an exemplary embodiment of the present invention.

FIG. 1 is a diagram for illustrating storage battery system 30 in accordance with the exemplary embodiment of the present invention. In the present exemplary embodiment, storage battery system 30 is connected to commercial AC power source 10, and is assumed to be a system for supplying AC power to load 20. Storage battery system 30 includes battery module 100, converter 110, inverter 120, power source switching unit 130, and control unit 160. Storage battery system 30 includes power source switching device 40 including power source switching unit 130 and power source switching control unit 162 (described later).

Battery module 100 is formed of one or more storage batteries (referred to also as "secondary batteries"). Each of the storage batteries included in battery module 100 is a lithium-ion battery or nickel-metal-hydride battery, for example. Battery module 100 is formed of a plurality of storage batteries interconnected in series in FIG. 1, but the number of storage batteries constituting battery module 100 may be one. A part or the whole of the storage batteries included in battery module 100 may be interconnected in parallel. In the present exemplary embodiment, charge and discharge mean the charge and discharge of battery module 100 if not otherwise specified.

In response to a command from control unit 160, converter 110 converts the AC power supplied from commercial AC power source 10 into direct current (DC) power, supplies the DC power to battery module 100, and charges battery module 100. In charging battery module 100, converter 110 manages the charge voltage and charge current in response to the command from control unit 160.

In response to a command from control unit 160, inverter 120 discharges battery module 100, converts the DC power supplied from battery module 100 into AC power, supplies the AC power to power source switching unit 130. In discharging battery module 100, inverter 120 manages the discharge voltage and discharge current in response to the command from control unit 160.

Power source switching unit 130 receives AC power from commercial AC power source 10 via line 140 and line 142. Power source switching unit 130 also receives AC power from inverter 120 via line 144 and line 146. In response to a command from control unit 160, power source switching unit 130 selects any one of the AC power supplied from commercial AC power source 10 and the AC power supplied from inverter 120, and supplies the selected AC power to load 20 via line 148 and line 150.

Control unit 160 manages the whole of storage battery system 30. First, control unit 160 manages the state of battery module 100, such as the state of charge (SOC) or temperature. In response to a user's operation, control unit 160 makes converter 110 control the charge, or makes inverter 120 control the discharge. Control unit 160 further includes power source switching control unit 162. Power source switching control unit 162 controls power source switching unit 130, and makes power source switching unit 130 control the switching between the AC power supplied from commercial AC power source 10 and the AC power supplied from inverter 120. For example, at a time of emergency such as a power failure of commercial AC power source 10, power source switching control unit 162 commands power source switching unit 130 to switch the AC power supplied to load 20 to the AC power supplied from inverter 120. When commercial AC power source 10 is restored, power source switching control unit 162 commands power source switching unit 130 to switch the AC power supplied to load 20 to the AC power supplied from commercial AC power source 10.

Figure 2:
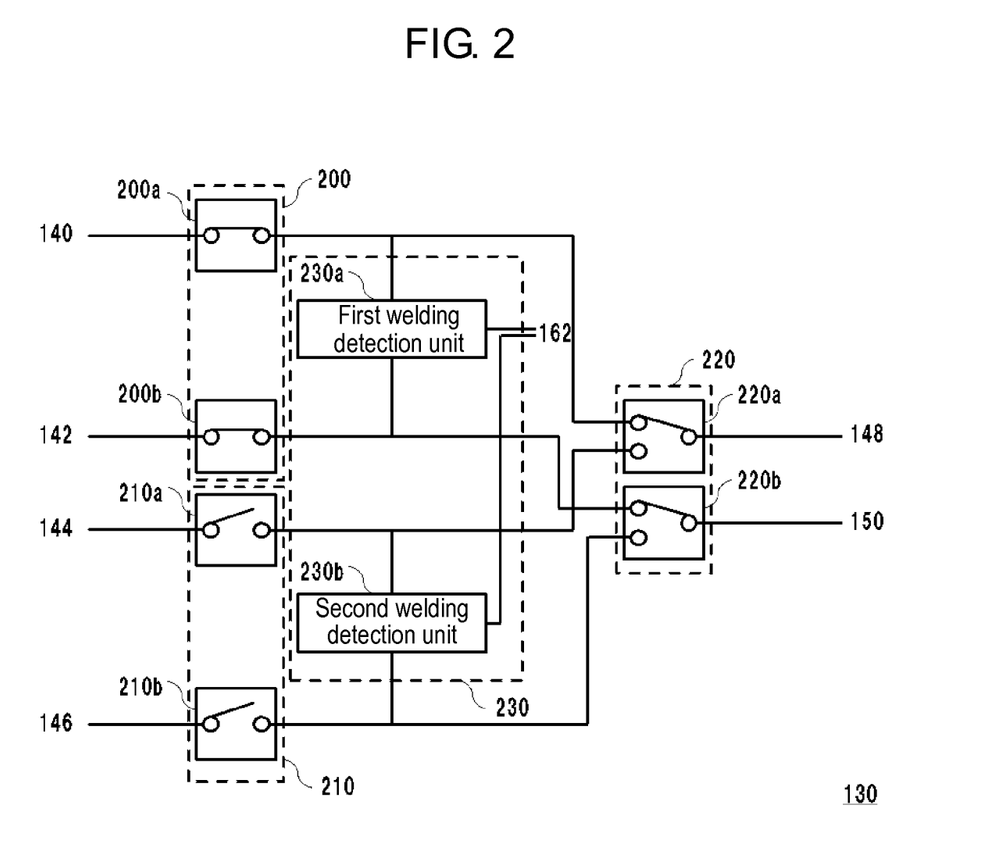
FIG. 2 is a diagram showing the configuration example of a power source switching unit in accordance with the exemplary embodiment of the present invention.

FIG. 2 is a diagram showing the configuration example of power source switching unit 130 in accordance with the exemplary embodiment of the present invention. Power source switching unit 130 mainly includes relay 200, relay 210, relay 220, and welding detection unit 230.

Relay 200 is disposed between commercial AC power source 10 and relay 220, is controlled to the closed state or the open state in response to a command by power source switching control unit 162. Relay 200 includes relay 200a and relay 200b. Relay 200a is disposed on line 140, and relay 200b is disposed on line 142. Relay 200a and relay 200b are controlled in conjunction, so that the closed state of relay 200 indicates that relay 200a and relay 200b are in the closed state if not otherwise specified. Similarly, the open state of relay 200 indicates that relay 200a and relay 200b are in the open state.

Relay 210 is disposed between inverter 120 and relay 220, and is controlled to the closed state or the open state in response to a command by power source switching control unit 162. Relay 210 includes relay 210a and relay 210b. Relay 210a is disposed on line 144, and relay 210b is disposed on line 146. Relay 210a and relay 210b are controlled in conjunction, so that the closed state of relay 210 indicates that relay 210a and relay 210b are in the closed state if not otherwise specified. Similarly, the open state of relay 210 indicates that relay 210a and relay 210b are in the open state.

In response to a command by power source switching control unit 162, relay 220 is controlled so that relay 220 is connected to any one of a first contact (upper contact in FIG. 2) on the side where the output of relay 200 is selected and a second contact (lower contact in FIG. 2) on the side where the output of relay 210 is selected. In other words, relay 220 selects any one of the output of commercial AC power source 10 fed via first relay 200 and the output of inverter 120 fed via second relay 210, and supplies the selected output to load 20. Relay 220 includes relay 220a and relay 220b. The first contact side of relay 220a is connected to one end of relay 200a, and the second contact side thereof is connected to one end of relay 210a. The first contact side of relay 220b is connected to one end of relay 200b, and the second contact side thereof is connected to one end of relay 210b. Relay 220a and relay 220b are controlled in conjunction, so that the state where relay 220 is connected to the first contact side shows the state where relay 220a and relay 220b are connected to the first contact side, if not otherwise specified. Similarly, the state where relay 220 is connected to the second contact side shows the state where relay 220a and relay 220b are connected to the second contact side.

Welding detection unit 230 detects welding of relay 200 or relay 210. Welding detection unit 230 includes first welding detection unit 230a and second welding detection unit 230b. First welding detection unit 230a is disposed between line 140 and line 142, and detects welding of relay 200. Second welding detection unit 230b is disposed between line 144 and line 146, and detects welding of relay 210.

Figure 3:
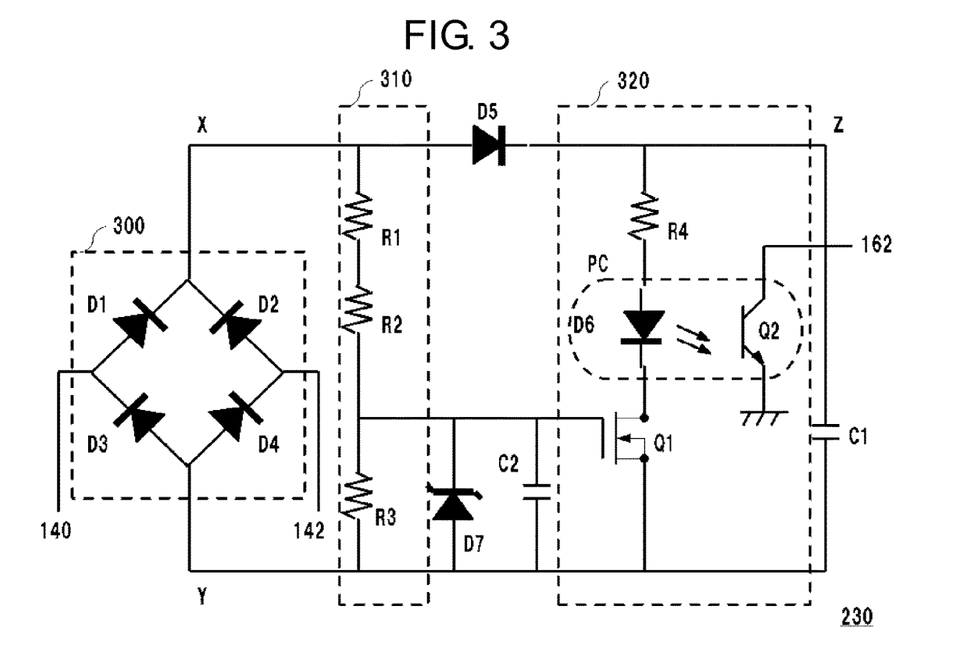
FIG. 3 is a diagram showing the configuration example of a first welding detection unit in accordance with the exemplary embodiment of the present invention.

FIG. 3 is a diagram showing the configuration example of first welding detection unit 230a in accordance with the exemplary embodiment of the present invention. Second welding detection unit 230b also may have the configuration similar to that in FIG. 3. First welding detection unit 230a mainly includes full wave rectifying circuit 300, voltage dividing circuit 310, and welding detection circuit 320.

Full wave rectifying circuit 300 is disposed between line 140 and line 142, and includes diode D1, diode D2, diode D3, and diode D4. The cathode terminal of diode D1 is connected to the cathode terminal of diode D2 (hereinafter, the contact between the cathode terminal of diode D1 and the cathode terminal of diode D2 is referred to also as "contact X"). The anode terminal of diode D1 is connected to the cathode terminal of diode D3 and line 140. The anode terminal of diode D3 is connected to the anode terminal of diode D4 (hereinafter, the contact between the anode terminal of diode D3 and the anode terminal of diode D4 is referred to also as "contact Y"). The cathode terminal of diode D4 is connected to the anode terminal of diode D2 and line 142. Diodes D1 to D4 are switched between the conductive state and non-conductive state, in response to the positive or negative of the alternating current input via line 140 and line 142. Specifically, when the alternating current is positive, diode D1 and diode D4 are in the conductive state, and diode D2 and diode D3 are in the non-conductive state. While, when the alternating current is negative, diode D1 and diode D4 are in the non-conductive state, and diode D2 and diode D3 are in the conductive state. Thus, full wave rectifying circuit 300 achieves full wave rectification by switching diodes D1 to D4 between the conductive state and non-conductive state.

Voltage dividing circuit 310 includes resistor element R1, resistor element R2, and resistor element R3. One end of resistor element R1 is connected to contact X, and the other end of resistor element R1 is connected to one end of resistor element R2. The other end of resistor element R2 is connected to one end of resistor element R3. The other end of resistor element R3 is connected to contact Y. In other words, resistor elements R1 to R3 are interconnected in series in this sequence between contact X and contact Y. Voltage dividing circuit 310 divides the output voltage of full wave rectifying circuit 300 at a voltage dividing ratio of (R3/(R1+R2+R3)), and outputs the obtained divided voltage (Vd) to the welding detection circuit.

One end of capacity element C1 is connected to the cathode terminal of diode D5 (hereinafter, the contact between one end of capacity element C1 and diode D5 is referred to also as "contact Z"), and the other end of capacity element C1 is connected to contact Y. The anode terminal of diode D5 is connected to contact X. Capacity element C1 receives the output current fed from full wave rectifying circuit 300 via diode D5, and smooths and supplies the output current to welding detection circuit 320. Diode D5 prevents the current supplied from capacity element C1 from flowing back to the full wave rectifying circuit 300 side.

Welding detection circuit 320 mainly includes resistor element R4, photo-coupler PC, and switching element Q1. Photo-coupler PC includes light emitting element D6, and light receiving element Q2. In the present exemplary embodiment, an example is described in which an n-type metal-oxide-semiconductor field-effect transistor (MOSFET), which is one of semiconducting switches, is employed as the switching element. Instead of the n-type MOSFET, an insulated gate bipolar transistor (IGBT), GaN transistor, or SiC transistor may be employed.

One end of resistor element R4 is connected to contact Z, and the other end of resistor element R4 is connected to the anode terminal of light emitting element D6 of the photo-coupler. Resistor element R4 prevents overcurrent from flowing through photo-coupler PC.

The cathode terminal of light emitting element D6 of photo-coupler PC is connected to the drain terminal of switching element Q1. The emitter terminal of light receiving element Q2 of photo-coupler PC is connected to the ground to which power source switching control unit 162 is connected. The collector terminal of light receiving element Q2 is connected to the drive power source of power source switching control unit 162 via a resistor element (not shown), and is connected to power source switching control unit 162. When current is supplied from capacity element C1, namely when alternating current is input via line 140 and line 142, light emitting element D6 emits light, light receiving element Q2 conducts, and photo-coupler PC outputs an L-level signal to power source switching control unit 162.

While, when current is not supplied from capacity element C1, namely when alternating current is not input via line 140 and line 142, light emitting element D6 does not emit light, light receiving element Q2 does not conduct, and photo-coupler PC outputs an H-level signal to power source switching control unit 162. The phenomenon in which photo-coupler PC outputs an L-level signal when relay 200 is controlled to the open state indicates that the output from commercial AC power source 10 cannot be blocked by relay 200, namely that relay 200 is welded. Thus, power source switching control unit 162 can detect the welding of relay 200 on the basis of the light emission state of light emitting element D6. Specifically, power source switching control unit 162 confirms an output signal of photo-coupler PC after a lapse of a predetermined period from the control of relay 200 to the open state, and detects the welding of relay 200.

The source terminal of switching element Q1 is connected to contact Y. The gate terminal of switching element Q1 is connected to the contact between resistor element R2 and resistor element R3 of voltage dividing circuit 310. The gate terminal of the switching element is connected to the cathode terminal of zener diode D7 and one end of capacity element C2, and the anode terminal of zener diode D7 and the other end of capacity element C2 are connected to contact Y. In other words, zener diode D7 and capacity element C2 are interconnected in parallel between the gate terminal of switching element Q1 and contact Y. The divided voltage output from voltage dividing circuit 310 is stabilized by zener diode D7, and is applied to the gate terminal of switching element Q1. Switching element Q1 conducts when a voltage of a first threshold voltage (Vth) or more is applied to the gate terminal, and a predetermined current flows from the source terminal to the drain terminal. By making switching element Q1 conduct, the light emitting state of light emitting element D6 can be stabilized, and the welding detection accuracy of welding detection circuit 320 can be improved.

Figure 4:
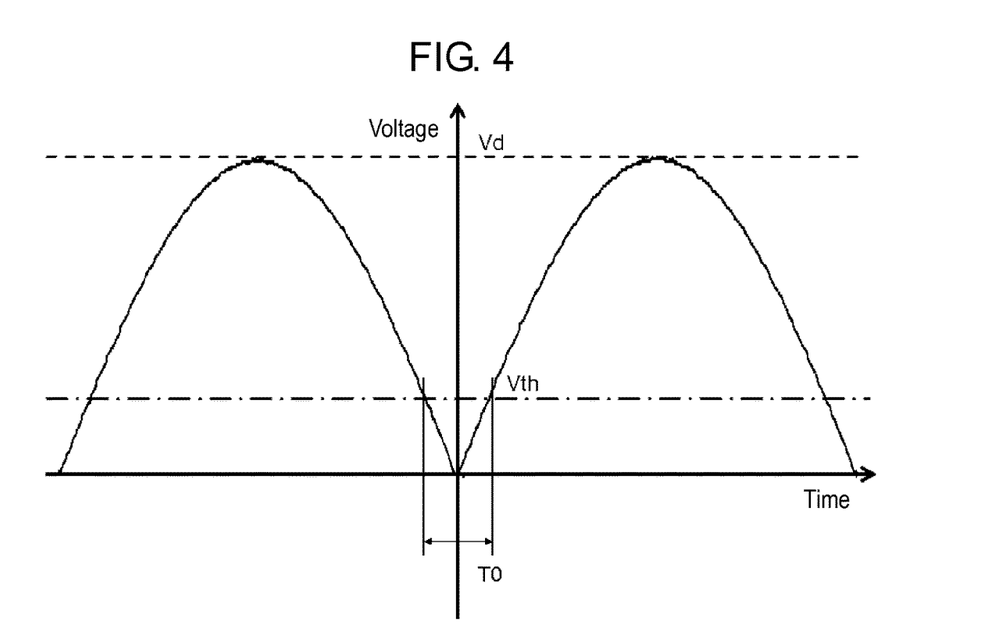
FIG. 4 is a diagram showing the output voltage of a full wave rectifying circuit in accordance with the exemplary embodiment of the present invention.

Voltage dividing circuit 310 outputs divided voltage Vd shown in FIG. 4. In FIG. 4, the period in which divided voltage Vd is lower than first threshold voltage Vth is denoted with T0. In period T0, switching element Q1 does not conduct, and light emitting element D6 cannot emit light. Power source switching control unit 162 detects welding of relay 200 in response to the light emission state of light emitting element D6, so that welding of relay 200 cannot be detected in period T0.

In the present exemplary embodiment of the present invention, capacity element C2 is connected in parallel between the gate terminal of switching element Q1 and contact Y. In period T0, the charge stored in capacity element C2 is released via resistor element R3. Thus, the divided voltage can be prevented from becoming lower than first threshold voltage Vth, and welding of relay 200 can be certainly detected even in period T0.

Divided voltage Vd is restricted to zener voltage (Vz) by zener diode D7, so that following equation (1) needs to be satisfied in order to detect the welding of relay 200 even in period T0.

[Expression 1]

$$V_z \times e^{\frac{-T0}{C2R3}} > V_{th} \tag{1}$$

Here, e in equation (1) shows an exponential function. Period T0 can be expressed by equation (2). Here, Vp shows the peak voltage of the pulsating voltage output by full wave rectifying circuit 300. V0 shows a specific pulsating voltage value (hereinafter referred to also as "second threshold voltage") that becomes equal to first threshold voltage Vth when the divided pulsating voltage by voltage dividing circuit 310 is applied to switching element Q1.

[Expression 2]

$$T0 = \left(\frac{2}{\omega}\right) \times \arcsin\left(\frac{V0}{Vp}\right) \tag{2}$$

Here, arcsin in equation (2) shows an arcsine function. Further, equation (3) is satisfied among first threshold voltage Vth, second threshold voltage V0, and the voltage dividing ratio.

[Expression 3]

$$V0 \times \left(\frac{R3}{R1 + R2 + R3}\right) = Vth \quad (3)$$

The capacity of capacity element C2 can be calculated using equations (1) to (3). For example, when the alternating current of 50 Hz at 100 V is supplied from commercial AC power source 10, Vp=141 V and ω=2π×50 Hz are satisfied. When it is assumed that R1=R2=R3=100 kΩ, Vth=4 V, and Vz=10 V are satisfied, T0=1.36 ms is obtained from equations (2) and (3). By substituting this result into equation (1), C2=0.022 uF can be obtained as the capacity of capacity element C2.

Next, the switching processing between the AC power sources by power source switching unit 130 is described. Hereinafter, for convenience in description, the AC power source as the switching origin is referred to also as "first AC power source", and the AC power source as the switching destination is referred to also as "second AC power source". The AC power supplied from the first AC power source is referred to also as "output of the first AC power source", and the AC power supplied from the second AC power source is referred to also as "output of the second AC power source". A pair of wires used for supplying the output of the first AC power source to power source switching unit 130 are referred to also as "first line and second line", and a pair of wires used for supplying the output of the second AC power source to power source switching unit 130 are referred to also as "third line and fourth line".

Furthermore, a relay disposed on the first line and second line is referred to also as "first relay", and a relay disposed on the third line and fourth line is referred to also as "second relay". A relay that switches between the output of the first AC power source fed via the first relay and the output of the second AC power source fed via the second relay and supplies the switching destination to load 2 is referred to also as "third relay".

Furthermore, the first or second welding detection unit disposed between the first line and second line is simply referred to also as "welding detection unit".

In the case of switching to the AC power supplied from inverter 120, the first AC power source corresponds to commercial AC power source 10, the second AC power source corresponds to inverter 120, the first line corresponds to line 140, the second line corresponds to line 142, the third line corresponds to line 144, the fourth line corresponds to line 146, the first relay corresponds to relay 200, the second relay corresponds to relay 210, and the welding detection unit corresponds to the first welding detection unit.

Conversely, in the case of switching to the AC power supplied from commercial AC power source 10, the first AC power source corresponds to inverter 120, the second AC power source corresponds to commercial AC power source 10, the first line corresponds to line 144, the second line corresponds to line 146, the third line corresponds to line 140, the fourth line corresponds to line 142, the first relay corresponds to relay 210, the second relay corresponds to relay 200, and the welding detection unit corresponds to the second welding detection unit. In both cases, the third relay corresponds to relay 220.

Power source switching control unit 162 performs control so that the first relay is switched from the closed state to the open state, and performs control so that the third relay is switched from the connection to the contact on the first relay side to that on the second relay side. The reason why the first relay and the third relay are simultaneously controlled is that executing the switching of the first relay and the switching of the third relay in parallel reduces the duration for switching the first relay and the third relay.

A method of switching the third relay at the timing when the output of the first AC power source becomes 0 V may be studied in consideration that there is a possibility of welding of the first relay. In this case, there is a possibility that arc continues in the period corresponding to up to a half cycle of the output of the first AC power source. Therefore, sometimes, power source switching control unit 162 cannot switch the third relay, and hence the duration for switching the first relay and the third relay extends.

While, in the exemplary embodiment of the present invention, power source switching control unit 162 switches the first relay and the third relay in parallel whether or not it is the timing when the output of the first AC power source becomes 0 V. Therefore, the duration for switching the first relay and the third relay can be reduced. The timing when the output of the first AC power source becomes 0 V does not need to be detected, and the switching processing between the AC power sources can be easily achieved. Furthermore, inverter 120 does not need to be synchronized with commercial AC power source 10, and the configuration and control of inverter 120 can be simplified.

In order to execute the control so that the second relay is switched after a lapse of the duration for switching the first relay and the third relay (hereinafter referred to also as "maximum switching duration"), power source switching control unit 162 acquires the maximum switching duration. For example, power source switching control unit 162 stores, in a storage unit (not shown), table data showing the correspondence between the switching duration, and the contact structures or states (operation states or return states) of the relays or the ambient temperature. Power source switching control unit 162 refers to the table data, compares the switching duration of the first relay with that of the third relay, and can acquire the longer switching duration as the maximum switching duration.

After a lapse of the maximum switching duration, both the first relay and the third relay have already been switched. However, power source switching control unit 162 does not immediately execute switching control of the second relay. The reason for this is described below. Until a lapse of the period (hereinafter referred to also as "delay time") corresponding to the time constant of a CR circuit that is formed of capacity element C2 and resistor element R3 (which are described above), switching element Q1 conducts even when the first relay is not welded. Therefore, light emitting element D6 sometimes emits light due to the discharge from capacity element C1, and the welding detection unit sometimes improperly detects the welding of the first relay.

Therefore, power source switching control unit 162 prohibits the switching control of the second relay in the period from the timing of a lapse of the maximum switching duration (hereinafter referred to also as "first timing") to the timing of a lapse of the delay time (hereinafter referred to also as "second timing"). Then, at the second timing, power source switching control unit 162 refers to the result of the first-relay welding detection processing executed by the welding detection unit, and, when the first relay is not welded, executes the control for switching the second relay from the open state to the closed state. Thus, even when arc current is generated in the third relay by the welding of the first relay, the arc current can be certainly prevented from flowing to the second AC power source side via the second relay. The processing of prohibiting the switching control of the second relay may be performed by executing the above-mentioned processing using software, or may be applied, using hardware, to a signal (hereinafter referred to also as "second-relay control signal") for switching control that is input to the second relay. The second-relay control signal, when being at the H level for example, commands the second relay to switch from the open state to the closed state. Specifically, power source switching control unit 162 includes a second-relay control signal generation circuit for generating a second-relay control signal by logical operation using an output signal of photo-coupler PC. Power source switching control unit 162 commands the second-relay control signal generation circuit to generate the second-relay control signal. The second-relay control signal generation circuit generates an original signal that becomes the H level at the first timing, for example. The second-relay control signal generation circuit generates the second-relay control signal by calculating the logical product of the generated original signal and the output signal of photo-coupler PC, and outputs the second-relay control signal to the second relay. As discussed above, the output signal of photo-coupler PC becomes the L level during light emission by light emitting element D6. Therefore, even when light emitting element D6 emits light due to the discharge from capacity element C1 until a lapse of the delay time, the second-relay control signal becomes the L level, and the switching control of the second relay is prohibited. The second-relay control signal becomes the L level during light emission by light emitting element D6, so that it can be said that the switching control of the second relay is prohibited even when the first relay is welded. Thus, the flowing of the arc current can be more certainly prevented.

Figure 5:
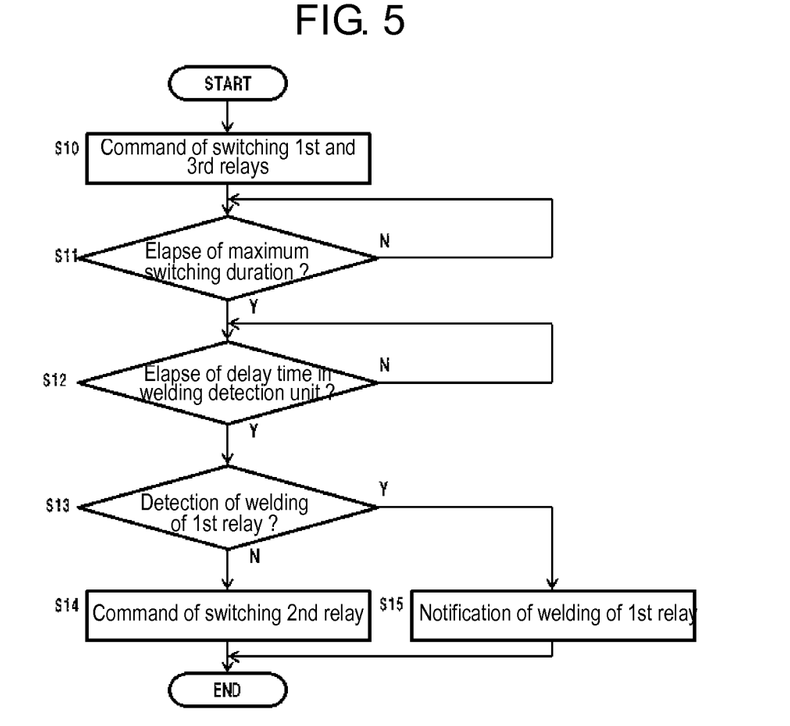
FIG. 5 is an operation flowchart related to switching between AC power sources in accordance with the exemplary embodiment of the present invention.

FIG. 5 is an operation flowchart related to switching between AC power sources in accordance with the exemplary embodiment of the present invention. Power source switching control unit 162 commands the first relay to switch from the closed state to the open state. Simultaneously, power source switching control unit 162 commands the third relay to switch from the connection to the contact side of the first relay to the connection to the contact side of the second relay (S10). Power source switching control unit 162 refers to the table data stored in the storage unit (not shown) and acquires the maximum switching duration. Power source switching control unit 162 determines whether or not the maximum switching duration has elapsed from the issuing of the switching command to the first relay and third relay (S11). When the maximum switching duration has elapsed (Y in S11), power source switching control unit 162 determines whether or not the delay time has elapsed in the welding detection unit (S12). When the delay time has elapsed (Y in S12), power source switching control unit 162 refers to the result of the first-relay welding detection processing executed by the welding detection unit (S13). When welding of the first relay is not detected by the welding detection unit (N in S13), power source switching control unit 162 commands the second relay to switch from the open state to the closed state (S14). When welding of the first relay is detected by the welding detection unit (Y in S13), power source switching control unit 162 notifies a user of the welding of the first relay via a display unit (not shown) (S15).

In the exemplary embodiment of the present invention, power source switching control unit 162 switches the first relay and the third relay in parallel, and prohibits the switching of the second relay until the first-relay welding detection processing by the welding detection unit is completed. Therefore, the duration for switching the first relay and the third relay can be reduced, and the second relay can be switched safely. As a result, the switching from the first AC power source to the second AC power source can be executed safely in a short time. The welding detection unit is disposed between the first line and the second line, so that the welding detection unit can certainly detect the welding of the first relay. The welding detection unit includes light emitting element D6 and detects the welding of the first relay in response to the light emission state of light emitting element D6, so that the influence of a noise or the like is small and the welding of the first relay can be stably detected. The welding detection unit includes switching element Q1 and capacity element C2, light emitting element D6 is connected to the second line via switching element Q1, and capacity element C2 is connected to the gate terminal of switching element Q1 in parallel. Therefore, the welding detection unit can detect the welding of the first relay without restriction of the detectable period. As a result, the welding of the first relay can be accurately detected.

The present invention has been described on the basis of the exemplary embodiment. The present exemplary embodiment is an example, and various combinations of components and processing processes can be employed as modified examples. As is understood to those skilled in the art, these modified examples are in the scope of the present invention.

FIRST MODIFIED EXAMPLE

For example, in the exemplary embodiment of the present invention, relay 200 includes relay 200a and relay 200b, relay 210 includes relay 210a and relay 210b, and relay 220 includes relay 220a and relay 220b. However, each of relay 200, relay 210, and relay 220 may be formed of one relay.

Specifically, relay 200 is disposed on line 140, and relay 210 is disposed on line 144. The first contact side of relay 220 is connected to one end of relay 200, and the second contact side thereof is connected to one end of relay 210. Line 142 and line 146 are directly connected to line 150. When relay 200 is in the closed state, a route including line 140, relay 200, relay 220, line 148, load 20, line 150, and line 142 is formed, so that AC power is supplied from commercial AC power source 10 to load 20. While, when relay 200 is in the open state, this route is not formed and AC power is not supplied from commercial AC power source 10 to load 20. Similarly, when relay 210 is in the closed state, AC power is supplied from inverter 120 to load 20. When relay 210 is in the open state, AC power is not supplied from inverter 120 to load 20. Therefore, also when each of relay 200, relay 210, and relay 220 is formed of one relay, the switching processing of the AC power source of the exemplary embodiment of the present invention can be applied. In the first modified example, the number of relays can be reduced, and the cost of the switching device of the power storage source can be reduced.

SECOND MODIFIED EXAMPLE

In the exemplary embodiment of the present invention, welding detection unit 230 detects the welding of relay 200 and relay 210. However, welding detection unit 230 may detect an improper connection in which an input-side terminal block (referred to also as "input terminal") and an output-side terminal block (referred to also as "output terminal") included in the main body of storage battery system 30 are wrongly wired.

Specifically, the main body of storage battery system 30 includes an input-side terminal block that is to be connected to commercial AC power source 10 by wiring. It is considered that storage battery system 30 supplies power to an electric lamp or fluorescent lamp in case of a power failure or supplies power to an apparatus used for peak shift. Therefore, the main body of storage battery system 30 includes an output-side terminal block that is to be connected to a distribution board or switchboard by wiring. In other words, storage battery system 30 is connected to commercial AC power source 10 via the input-side terminal block, and supplies AC power to load 20 via the output-side terminal block.

Terminal blocks having the same shape are used as the input-side terminal block and output-side terminal block, and hence an improper connection can occur in which the input-side terminal and the output-side terminal are wrongly wired. In the second modified example, this improper connection is detected using welding detection unit 230 of the exemplary embodiment of the present invention.

The timing of detecting the improper connection corresponds to the start time of storage battery system 30. Storage battery system 30 is started, for example, when the power source of storage battery system 30 is turned on by connecting the wire on the input side or output side in the OFF state of the power source of storage battery system 30.

Figure 6:
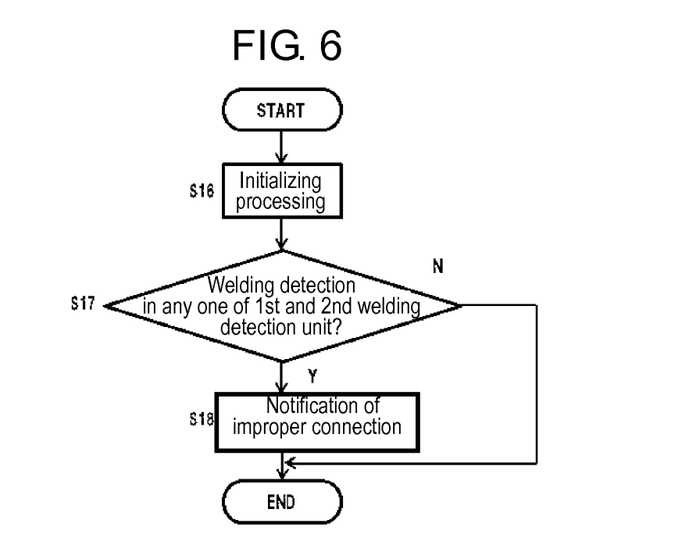
FIG. 6 is an operation flowchart related to the detection of an improper connection of a second modified example in accordance with the exemplary embodiment of the present invention.

FIG. 6 is an operation flowchart related to the detection of the improper connection. Control unit 160 performs initializing processing. Specifically, when relay 200 or relay 210 is in the closed state, power source switching control unit 162 commands the switching from the closed state to the open state (S16). This operation of the initializing processing may be omitted when the processing of switching relay 200 or relay 210 to the open state has been performed at the time of the previous shutdown.

Control unit 160 determines whether or not welding is detected in any one of first welding detection unit 230a and second welding detection unit 230b (S17). When welding is detected neither in first welding detection unit 230a nor in second welding detection unit 230b (517N), control unit 160 determines that appropriate connection is performed, and completes the operation flow. Control unit 160 may go to the next starting process after the completion of the operation flow for detecting an improper connection, or may allow the going to the next starting process by temporarily stopping the operation flow for detecting the improper connection. While, when welding is detected in any one of first welding detection unit 230a and second welding detection unit 230b (517Y), current flows from the load 20 side via relay 220 to first welding detection unit 230a or second welding detection unit 230b. Therefore, control unit 160 determines that an improper connection is performed, and notifies a worker of the improper connection by displaying the improper connection on a display unit (not shown) or issuing an alarm (S18).

In the second modified example, when welding is detected by welding detection unit 230 in the open state of relay 200 and relay 210, power source switching control unit 162 can determine that wiring of the input-side terminal block and the output-side terminal block is improperly connected. When welding detection unit 230 is used for detecting an improper connection, a new improper connection detection unit does not need to be disposed as hardware. Therefore, the safety improvement and the cost reduction of storage battery system 30 can be reconciled with each other.

The invention related to the present exemplary embodiment may be specified with the items described later.

[Item 1]

A power source switching device includes the following components: a third relay for switching between an output of a first AC power source fed via a first relay and an output of a second AC power source fed via a second relay, and supplying the output after the switching to a load;

a welding detection unit for detecting welding of the first relay; and a power source switching control unit that, in order to switch the output of the first AC power source to the output of the second AC power source and supply the output of the second AC power source to the load, switches the first relay from the closed state to the open state, switches the third relay so as to select and feed the output of the second AC power source, and then prohibits switching of the second relay from the open state to the closed state until a first-relay welding detection processing by the welding detection unit is completed.

[Item 2]

The power source switching device according to item 1 in which the first AC power source is connected to the third relay via the first relay at a first line and a second line, and the welding detection unit is disposed between the first line and the second line.

[Item 3]

The power source switching device according to item 2 in which the welding detection unit includes a light emitting element, and detects the welding of the first relay in response to the light emission state of the light emitting element.

[Item 4]

The power source switching device according to item 3 in which the welding detection unit further includes a switching element and a capacity element. The light emitting element is connected to the second line via the switching element. A control terminal of the switching element is connected to the second line via the capacity element.

[Item 5]

A storage battery system includes the following components:

the power source switching device according to one of item 1 to item 4;

a battery;

a first power conversion device for converting the output of the first AC power source into direct current and outputting the direct current to the battery; and a second power conversion device that is combined with the battery into the second AC power source, and converts an output of the battery into alternating current and outputs the alternating current.

[Item 6]

The storage battery system according to item 5 in which the first AC power source is a commercial AC power source. The storage battery system further includes an input terminal connected to the first AC power source and an output terminal connected to the load. When the welding detection unit detects the welding of the first relay at the start of the storage battery system, the power source switching device determines that the first AC power source is improperly connected to the output terminal.

INDUSTRIAL APPLICABILITY

The power source switching device of the present invention is a power source switching device having a welding detection function, and is useful for a backup power source or electric vehicle.

The invention claimed is:

1. A power source switching device comprising:
a third relay for switching between an output of a first AC power source fed via a first relay and an output of a second AC power source fed via a second relay, and supplying the output after the switching to a load;
a welding detection unit for detecting welding of the first relay; and
a power source switching control unit for,
in order to switch the output of the first AC power source to the output of the second AC power source, and supply the output of the second AC power source to the load,
switching the first relay from a closed state to an open state, switching the third relay so as to select and feed the output of the second AC power source, and then prohibiting switching of the second relay from the open state to the closed state until a first-relay welding detection processing by the welding detection unit is completed,
wherein the first relay and the third relay are simultaneously controlled so that switching of the first relay and switching of the third relay are performed in parallel.

2. The power source switching device according to claim 1, wherein
the first AC power source is connected to the third relay via the first relay at a first line and a second line, and
the welding detection unit is disposed between the first line and the second line.

3. The power source switching device according to claim 2, wherein
the welding detection unit includes a light emitting element, and detects the welding of the first relay in response to a light emission state of the light emitting element.

4. The power source switching device according to claim 3, wherein
the welding detection unit further includes a switching element and a capacity element, the light emitting element is connected to the second line via the switching element, and
a control terminal of the switching element is connected to the second line via the capacity element.

5. A storage battery system comprising:
the power source switching device according to claim 1;
a battery;
a first power conversion device for converting the output of the first AC power source into direct current and outputting the direct current to the battery; and
a second power conversion device combined with the battery into the second AC power source, and converting an output of the battery into alternating current and outputting the alternating current.

6. The storage battery system according to claim 5, wherein
the first AC power source includes a commercial AC power source,
the storage battery system further includes an input terminal connected to the first AC power source and an output terminal connected to the load, and
when the welding detection unit detects the welding of the first relay at a start of the storage battery system, the power source switching device determines that the first AC power source is improperly connected to the output terminal.

* * * * *